United States Patent Office 3,054,166
Patented Sept. 18, 1962

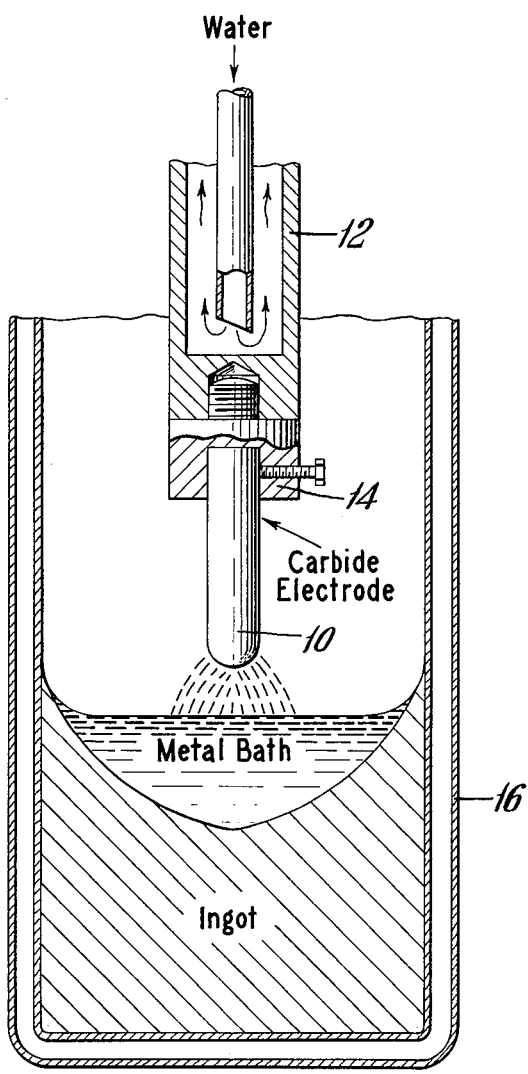

3,054,166
ELECTRODES FOR MELTING REFRACTORY METALS
Howard R. Spendelow, Jr., Chappaqua, N.Y., Robert L. Folkman, Lake Lucerne, Ohio, and Charles R. Allenbach, Williamsville, N.Y., assignors to Union Carbide Corporation, a corporation of New York
Filed Feb. 27, 1959, Ser. No. 796,174
11 Claims. (Cl. 29—182.8)

This invention relates to novel non-consumable electrodes and to a process for the manufacture of such electrodes for the arc melting of the high-melting point, reactive, refractory metals of groups IV, V, and VI of the periodic table of the elements.

As hereinafter employed, the term "periodic table" refers to the periodic table as presented in the "Handbook of Chemistry and Physics," 37th edition, Chemical Rubber Publishing Company, pages 392 and 393.

The methods by which high-melting point, reactive, refractory metals, e.g., titanium, tantalum, columbium, vanadium, zirconium, molybdenum, tungsten, etc., are produced are such that the final material is obtained in the form of dendrites, powder, or sponge. To produce sheets, bars, rods, or other shaped articles from metals in these forms, it is necessary to form them into ingots which may be subsequently subjected to hot or cold working. Normal melting practices to produce ingots of these metals are not generally employed, since the metals have very high melting points and also have a great affinity for oxygen and nitrogen; thus, the melting must be conducted either under a vacuum or under a protective atmosphere.

Hitherto, two distinct methods have been employed to melt the metals in question. In one method the metal in its sponge or other form is compressed into a so-called consumable electrode. This electrode is fed into a furnace toward a crucible and upon an electric arc being struck, the electrode is progressively melted into the crucible. The other method, with which this invention is concerned, comprises feeding the metal to a water-cooled crucible in which it is melted by the heat of an arc produced by a non-consumable refractory electrode such as tungsten or carbon. In this method, generally, a small amount of material is melted at a time and an ingot is progressively built up from additional raw material fed to the arc and the molten puddle. Severe contamination of the melt from the electrode material substantially affects the sought-after ductility and low hardness value of the final product. For this reason, the practice of arc melting with non-consumable electrodes gave way to the previously-described consumable electrode melting method.

The primary object of this invention is to provide a non-consumable electrode for arc melting refractory metals, which electrode will not contaminate such metals.

Another object of the invention is to provide a group of non-consumable electrodes suitable for arc melting into ingot form, sponge, or scrap of metals found in groups IV, V, and VI of the periodic table.

A further object of the invention is to provide non-consumable electrodes for the arc melting of metals falling within groups IV, V, and VI of the periodic table, which electrodes are fabricated from the carbide of the refractory metal being melted.

A still further object of the invention is to provide a process for the production of non-consumable electrodes for arc melting high-melting point, reactive, refractory metals of groups IV, V, and VI of the periodic table of the elements, which electrodes will not contaminate such metals.

These and related objects of the invention will become apparent from the following description when taken in conjunction with the drawing, the single figure of which is a vertical sectional elevation view of an arc melting apparatus equipped with the electrode of the invention.

In accordance with this invention, the non-consumable electrode for arc melting of high-melting point, reactive, refractory metals of groups IV, V, and VI of the perodic table consists essentially of a carbide of said metals, 3 to 9 percent free carbon, up to 3.0 percent iron, and the balance incidental impurities.

For the sake of conciseness, confirmatory evidence of the practicality of the electrode of the invention will be illustrated by referring solely to arc melting tests in which titanium carbide non-consumable electrodes were employed to produce massive titanium metal from itanium sponge. It should be understood, however, that for example, where the melting of zirconium is desired, zirconium carbide electrodes should be employed and where titanium melting is sought, titanium carbide electrodes are to be employed. Similarly, tantalum, columbium, vanadium, molybdenum, and tungsten carbide electrodes are within the scope of this invention.

General techniques can be used to provide free carbon to the carbide material from which the electrodes of this invention are to be fabricated. In the case of titanium carbide, the normal amount of the combined carbon is about 19.8 percent. By providing an excess of carbon in the preparation of titanium carbide, a final titanium carbide product having an excess of several percent free carbon is obtained. It is also possible to add the required free carbon, preferably as graphite powder, to a carbide material having the stoichiometric amount of carbon.

The non-consumable electrodes of the aforementioned composition, for arc melting of high-melting point, reactive, refractory metals can be prepared by hot-pressing or formed by means, such as by extruding followed by sintering. However, when titanium carbide electrodes are prepared by extrusion and sintering, it is preferred that the free carbon level be maintained between 3 and about 8 percent, and when the titanium carbide electrodes are prepared by hot-pressing, it is preferred that the free carbon level be maintained between about 6 and 9 percent. In the preparation of electrodes of other carbides of this invention, it is preferred to maintain the free carbon level on the high side, although suitable results are obtained with the lower free carbon levels.

Additionally, it has been found that, in preparing a finely-divided mixture of the metal carbide and excess free carbon, minor amounts of materials such as iron, cobalt, and nickel can be introduced into the mixture. Up to about 3 percent of these materials, either in their oxide or metallic form, are beneficial.

In the single figure of the drawing, an electrode of this invention, 10, as above prepared, is secured in a water-cooled electrode shaft 12 by means of copper adapter 14. As shown, this assembly is inserted in a water-cooled copper crucible 16 of an arc furnace in which an inert atmosphere is maintained.

In an example of this invention, a series of electrodes ⅜ inch in diameter and from 1½ to 2 inches long were prepared. The free carbon content of the electrodes was controlled by admixing pure titanium carbide powder with high-carbon titanium carbide powder in such ratio as to produce the desired free carbon content. These powders were then hot-pressed in suitable dies to small, round, pencil-like electrodes having the above-indicated dimensions.

These electrodes were tested in an arc melting furnace. They performed well with no apparent electrode loss.

Each held a suitable arc and showed no signs of disintegration or deterioration. The following carbon analysis of the titanium sponge used in the melting test and of the massive titanium resulting in arc melting with titanium carbide electrodes appear in Table I.

Table I

| Metal: | Percent carbon |
|---|---|
| Titanium sponge | 0.045 |
| Titanium melted with a titanium carbide electrode containing 7 percent free carbon | 0.043 |
| Titanium melted with a titanium carbide electrode containing 9 percent free carbon | 0.068 |

In an additional example of this invention, titanium carbide electrodes having approximately the same dimensions as those in the prior example were extruded and sintered to produce small, round, pencil-like electrodes. In order to obtain the desired free carbon content, finely-divided carbon in the form of graphite, was added to finely-divided titanium carbide of the following composition, by weight percent: titanium 76.74, combined carbon 18.56, free carbon 0.33, iron, 1.95, silicon 0.12, oxygen 1.8, and nitrogen 0.049. The finely-divided titanium carbide and carbon were mixed with a binding material and water, extruded and sintered at 2400° C.

These electrodes performed well with no apparent electrode loss. Each held a suitable arc and showed no signs of disintegration or deterioration. The following carbon analysis of the titanium sponge used in the melting test and of the massive titanium in arc melting with titanium carbide electrodes appears in Table II.

Table II

| Metal: | Percent carbon |
|---|---|
| Titanium sponge | 0.035 |
| Titanium melted with a titanium carbide electrode containing 4 percent free carbon | 0.18 |
| Titanium melted with a titanium carbide electrode containing 6 percent free carbon | 0.31 |

In addition to the formation of metal ingots, reactive metal alloys may also be produced by arc melting in the manner outlined above, provided that sufficient free carbon be incorporated in the electrode to offset the normal tendency of the carbides to disintegrate from thermal shock.

While the electrodes of the present invention possess substantial advantages over prior art non-consumable electrodes, they are also more advantageous than consumable electrodes regarding the additional work entailed in scrap metal recovery. Thus, in melting techniques employing consumable electrodes, not only must scrap metal be properly segregated and cleaned before it can be used for arc melting, but some shapes and sizes are difficult, if not impossible, to compress into electrode forms. Further, some scrap metal pieces are so large that they must be chipped before they can be suitably formed into electrodes. In addition to the cost entailed by enumerated operations, there is danger that the chipping device may contaminate the end product.

By means of electrodes of this invention, the necessity for fabricating consumable electrodes from reactive metal sponge is eliminated and the metal scrap which results from the fabrication of machine parts may be fully utilized to produce additional ingots.

The presence of up to about 3 percent of materials, such as iron, cobalt, and nickel, and preferably about 2 percent iron results in the production of an electrode having improved thermal shock resistance.

This application is a continuation-in-part of co-pending application Serial No. 603,144 filed August 9, 1956.

What is claimed is:

1. A non-consumable electrode for arc melting of high-melting point, reactive, refractory metals of groups IV, V, and VI of the periodic table, which electrode consists essentially of a carbide of said metals, 3 to 8 percent free carbon, up to 3 percent iron, and the balance incidental impurities.

2. An extruded-and-sintered non-consumable electrode for arc melting of titanium, which electrode consists of 3 to 8 percent free carbon, about 2 percent iron, and the balance titanium carbide and incidental impurities.

3. A hot-pressed non-consumable electrode for arc melting of titanium which electrode consists of 6 to 8 percent free carbon and the balance titanium carbide and incidental impurities.

4. An extruded-and-sintered non-consumable electrode for arc melting of tantalum which electrode consists of 3 to 8 percent free carbon and the balance tantalum carbide and incidental impurities.

5. A hot-pressed non-consumable electrode for arc melting of tantalum which electrode consists of 6 to 8 percent free carbon and the balance tantalum carbide and incidental impurities.

6. An extruded-and-sintered non-consumable electrode for arc melting of vanadium which electrode consists of 3 to 8 percent free carbon and the balance vanadium carbide and incidental impurities.

7. A hot-pressed non-consumable electrode for arc melting of vanadium which electrode consists of 6 to 8 percent free carbon and the balance vanadium carbide and incidental impurities.

8. An extruded-and-sintered non-consumable electrode for arc melting of zirconium which electrode consists of 3 to 8 percent free carbon and the balance zirconium carbide and incidental impurities.

9. A hot-pressed non-consumable electrode for arc melting of zirconium which electrode consists of 6 to 8 percent free carbon and the balance zirconium carbide and incidental impurities.

10. An extruded-and-sintered non-consumable electrode for arc melting of columbium which electrode consists of 3 to 8 percent free carbon and the balance columbium carbide and incidental impurities.

11. A hot-pressed non-consumable electrode for arc melting of columbium which electrode consists of 6 to 8 percent free carbon and the balance columbium carbide and incidental impurities.

References Cited in the file of this patent

UNITED STATES PATENTS

| 789,609 | Holmes et al. | May 9, 1905 |
| 859,292 | Harden | July 7, 1907 |
| 1,794,300 | Kelley | Feb. 24, 1931 |
| 2,120,562 | Laise | June 14, 1938 |
| 2,195,297 | Engle | Mar. 26, 1940 |
| 2,378,539 | Dawihl | June 19, 1945 |

OTHER REFERENCES

Goetzel: Treatise on Powder Metallurgy, vol. 2, 1950, page 82.